United States Patent [19]

Oda et al.

[11] 4,202,743

[45] May 13, 1980

[54] ELECTROLYSIS OF AQUEOUS SOLUTION OF SODIUM CHLORIDE

[75] Inventors: Yoshio Oda; Manabu Suhara; Shoziro Goto; Takashi Hukushima, all of Yokohama; Koji Miura, Chohfu; Toshikatsu Hamano, Yokohama, all of Japan

[73] Assignee: Asahi Glass Company, Limited, Tokyo, Japan

[21] Appl. No.: 902,084

[22] Filed: May 2, 1978

[30] Foreign Application Priority Data

May 4, 1977 [JP] Japan .................................. 52-50685
Nov. 29, 1977 [JP] Japan ................................ 52-142269

[51] Int. Cl.² ......................... C25B 1/16; C25B 1/26
[52] U.S. Cl. .................................... 204/98; 204/128
[58] Field of Search .................... 204/98, 128; 423/157

[56] References Cited

U.S. PATENT DOCUMENTS

| 4,040,919 | 8/1977 | Eng | 204/98 |
| 4,065,366 | 12/1977 | Oda et al. | 204/98 |
| 4,073,706 | 2/1978 | Nagy | 204/98 |
| 4,123,336 | 10/1978 | Seko et al. | 204/98 |

OTHER PUBLICATIONS

Chem. Abstracts, vol. 79, 1973, Item 147837t.
Chem. Abstracts, vol. 85, 1976, Item 168892w.

*Primary Examiner*—R. L. Andrews
*Attorney, Agent, or Firm*—Oblon, Fisher, Spivak, McClelland & Maier

[57] ABSTRACT

An electrolysis of an aqueous solution of sodium chloride is carried out by employing a fluorinated cation exchange membrane having an ion-exchange capacity of 0.8 to 2.0 meq/g dry polymer and having carboxylic acid groups as functional groups and maintaining a concentration of an aqueous solution of sodium hydroxide in a cathode compartment in a range of 20 to 45 wt. % and maintaining a calcium concentration in the aqueous solution of sodium chloride to lower than 0.08 mg/liter.

The purification of the aqueous solution of sodium chloride to reduce the calcium concentration is carried out in a system comprising the first and second chelate ion-exchange towers which are connected through a detector for detecting impurities in the aqueous solution.

12 Claims, 4 Drawing Figures

ELECTROLYSIS OF AQUEOUS SOLUTION OF SODIUM CHLORIDE

BACKGROUND OF THE INVENTION

1. Field of the Invention

The present invention relates to an electrolysis of an aqueous solution of sodium chloride. More particularly, it relates to an electrolysis of an aqueous solution of sodium chloride at low voltage, at high current efficiency and remains stable for a long time so as to be satisfactory as an industrial process.

2. Description of the Prior Arts

The ion-exchange membrane type electrolysis of sodium chloride which employs an ion-exchange membrane as a diaphragm, has been studied as a process for producing chlorine and sodium hydroxide of high purity which does not substantially contain sodium chloride.

However, an aqueous solution of sodium chloride is contacted through an ion-exchange membrane with an aqueous solution of sodium hydroxide having relatively high concentration in the ion-exchange membrane type electrolysis, whereby calcium ions and magnesium ions in the aqueous solution of sodium chloride, contact with hydroxyl ions in the ion-exchange membrane to produce insoluble hydroxides and to form fine precipitates. Accordingly, it causes serious problems such as the increase of electrolytic voltage and the decrease of current efficiency and the decrease of strength of the ion-exchange membrane and the deterioration of the structure of the membrane during the operation.

In order to overcome these difficulties, it is necessary to purify the aqueous solution of sodium chloride as the raw material fed to an anode compartment, to a higher degree than with the electrolysis in the conventional mercury process or the asbestos diaphragm process.

The aqueous solution of sodium chloride fed in the conventional ion-exchange membrane process has more than about 0.1 to 0.5 mg/liter of calcium concentration as disclosed in Japanese Unexamined Patent Publication Nos. 52698/1973 and No. 86100/1976.

It has been considered to substantially overcome said difficulties by purifying it to said level.

However, the inventors have studied the fluorinated cation exchange membranes having carboxylic acid groups as functional groups which have been known as a high performance membrane in an electrolysis of an alkali metal compound. As a result, the inventors have found that the allowable calcium concentration in an aqueous solution of sodium chloride (brine) for a stable electrolysis for a long time at low voltage and high current efficiency, so as to be satisfactory as an industrial process, should be lower than the proposed calcium concentration of the prior art though it depends upon ion-exchange capacity, and a concentration of an aqueous solution of sodium hydroxide in a cathode compartment.

That is, the inventors have studied the effect of small amounts of calcium component in an aqueous solution of sodium chloride (brine) under conditions employing the fluorinated cation exchange membrane having an ion-exchange capacity of 0.8 to 2.0 meq/g dry polymer and having carboxylic groups as functional groups, and maintaining the concentration of the aqueous solution of sodium hydroxide in the cathode compartment in a range of 20 to 45 wt.% (See Experiment 1). As a result, the following new fact has been found.

In the case of the production of 40% aqueous solution of sodium hydroxide in the cathode compartment by an electrolysis of an aqueous solution of sodium chloride at a calcium concentration of 0.005 to 0.5 mg/liter, the $Ca^{++}$ precipitation velocity (b) ($\mu g/hour \cdot cm^2$) in the absorption of $Ca^{++}$ into the membrane was measured from the calcium content in the membrane during the electrolysis for definite times.

FIG. 1 shows the relation between the $Ca^{++}$ concentration (mg/l) in the aqueous solution of sodium chloride (charged brine) and the $Ca^{++}$ precipitation velocity ($\mu g/hour \cdot cm^2$).

As it is clearly understood from the result of FIG. 1, the $Ca^{++}$ ion precipitation velocity is zero at the calcium concentration of 0.02 mg/liter on abscissa.

Accordingly, when the calcium concentration in the aqueous solution of sodium chloride (brine) is lower than 0.02 mg/liter, calcium ion is not precipitated into the membrane whereby the accumulation of calcium component is not caused.

The critical calcium concentration in the aqueous solution of sodium chloride (brine) is measured under varying concentrations of the aqueous solution of sodium hydroxide in the cathode compartment. The result is shown in FIG. 2.

In accordance with these findings, the $Ca^{++}$ precipitation velocity to the cation exchange membrane is zero and the accumulation of calcium in the membrane is not caused when the calcium concentration in the aqueous solution of sodium chloride (brine) is kept lower than the critical calcium concentration shown in FIG. 2, in the production of sodium hydroxide at the specific concentration.

However, according to further studies by the inventors, it has been found that the deterioration of the electrochemical characteristics of the cation exchange membrane in the electrolysis of an aqueous solution of sodium chloride is not found during the electrolysis of an aqueous solution of sodium chloride containing calcium component at higher than the critical calcium concentration and the accumulation of calcium component is gradually caused at calcium concentration in a range of slightly higher than the critical calcium concentration.

As the result, it has been found that the calcium concentration in the aqueous solution of sodium chloride need not always be maintained lower than the critical calcium concentration but it can be slightly higher than the critical calcium concentration in order to maintain the life of the cation exchange membrane for longer than a half year preferably longer than one year which is required for the ion-exchange membrane employed in an industrial electrolysis.

Thus, the critical value curve becomes gradually flatter upon increasing the concentration of the resulting sodium hydroxide in the range of 20 to 45 wt.% as shown in FIG. 2 and the abovementioned requirements may be satisfied when the calcium concentration is lower than 0.08 mg/liter as the allowable calcium concentration.

It is preferable for longevity of cation exchange membrane to decrease the calcium content in the aqueous solution of sodium chloride (brine) whereby the load of the purification system for removing calcium components is increased. The discovery of the fact that the calcium content in the aqueous solution of sodium chloride can be higher than the critical calcium concentration in the invention is important for industrial operations because the load on the purification system can be mitigated.

SUMMARY OF THE INVENTION

It is an object of the present invention to provide an electrolysis of an aqueous solution of sodium chloride at low voltage, at high current efficiency and which remains stable for a long period in industrial operation while mitigating the need for purification of the aqueous solution of sodium chloride.

The foregoing and other objects of the present invention have been attained by providing an electrolysis of an aqueous solution of sodium chloride by employing a fluorinated cation exchange membrane having an ion-exchange capacity of 0.8 to 2.0 meq/g dry polymer and having carboxylic groups as functional groups and maintaining the concentration of an aqueous solution of sodium hydroxide in the cathode compartment in a range of 20 to 45 wt% and maintaining the calcium concentration in the aqueous solution of sodium chloride at lower than 0.08 mg/liter.

In accordance with the electrolysis of the present invention, by controlling the calcium concentration in the aqueous solution of sodium chloride in said range, the precipitation or accumulation of calcium component in the cation exchange membrane is substantially minimized to attain the electrolysis of an aqueous solution of sodium chloride to produce sodium hydroxide at a concentration of 20 to 45 wt.%, without the increase of resistance of the membrane, the decrease of current efficiency and the deterioration of mechanical strength of the membrane for longer than a half year especially longer than one year which is required for the industrial operation.

When the concentration of sodium hydroxide is higher than 45 wt.%, carboxylic acid groups in the cation exchange membrane, as the functional groups, are adversely affected so as to cause a deterioration of the membrane.

DETAILED DESCRIPTION OF THE PREFERRED EMBODIMENTS

Figure 1:
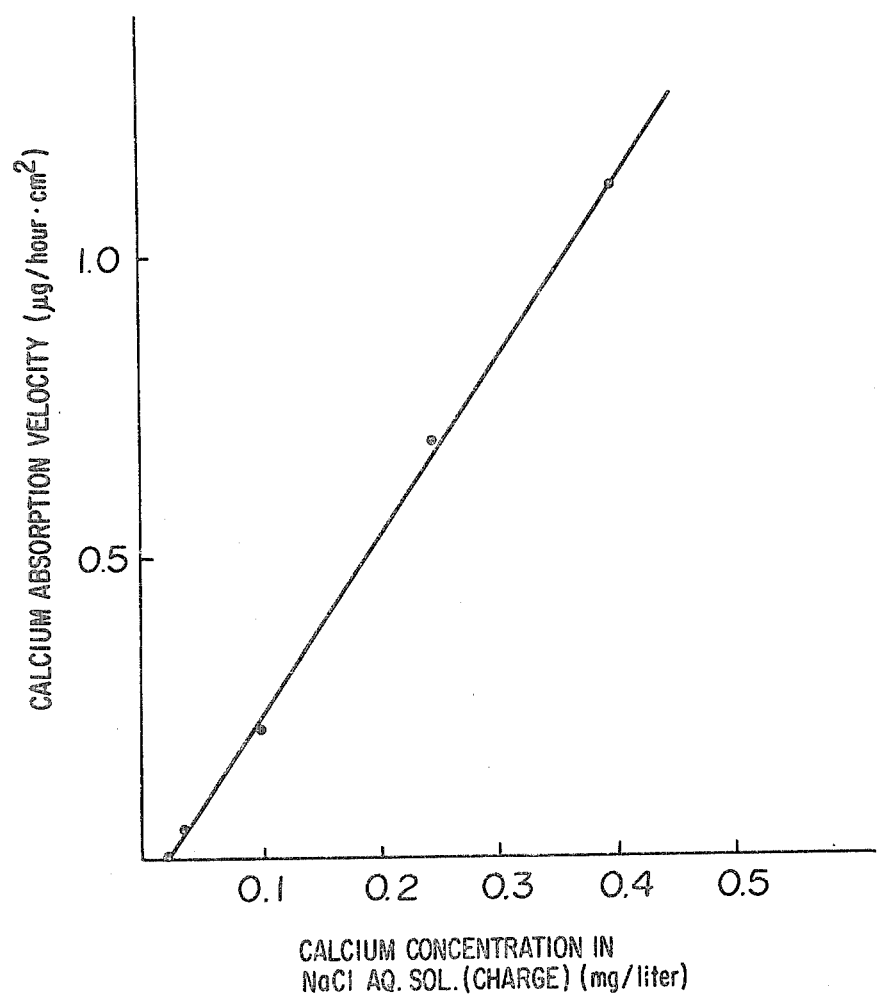
FIG. 1 shows the relation between the calcium concentration (mg/liter) in an aqueous solution of sodium chloride as a feed and the calcium precipitation velocity ($\mu$g/hour·cm$^2$).

The fluorinated cation exchange membrane having an ion-exchange capacity of 0.8 to 2.0 meq/g dry polymer and having carboxylic acid groups as functional groups is employed in the electrolysis of the present invention.

When the functional groups are not carboxylic acid groups but sulfonic acid groups, or the ion-exchange capacity is out of said range, the allowable calcium concentration in the aqueous solution of sodium chloride (brine) is different and sodium hydroxide having high concentration of 20 to 45 wt.% may not obtain at high current efficiency.

The term carboxylic acid groups in the present invention means groups such as —COOH and —COOM (M is defined below) which can dissociate to —COO— under the conditions of the electrolysis. The ion-exchange capacity is preferably in a range of 1.2 to 1.7 meq/g dry polymer.

Various fluorinated polymers can be used for preparing the fluorinated cation exchange membrane. The optimum fluorinated polymers are copolymers produced by copolymerizing a fluoroolefin monomer and a comonomer having carboxylic acid group or the other functional group which can be converted to carboxylic acid group.

It is especially preferable to use monomers for forming the following units (a) and (b) in the copolymer.

(a) 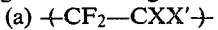

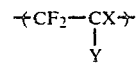

wherein X represents fluorine, chlorine or hydrogen atom or —CF$_3$; X' represents X or CF$_3$(CF$_2$)$_m$; m represents an integer of 1 to 5 and Y represents

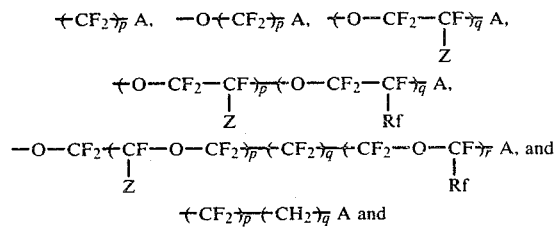

p, q and r respectively represent an integer of 1 to 10; Z and Rf represent —F or a C$_1$-C$_{10}$ perfluoroalkyl group; A represents

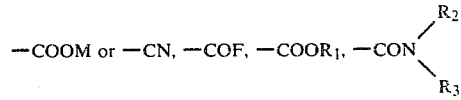

as a functional group which can be converted to carboxylic acid group by a hydrolysis or a neutralization; R$_1$ represents a C$_1$-C$_{10}$ alkyl group; M represents an alkali metal or a quaternary ammonium group; R$_2$ and R$_3$ respectively represent a C$_1$-C$_{10}$ alkyl group.

In the case of the copolymers having the units (a) and (b), the ratio of the units (b) to the units (a) in the copolymer is selected so as to give said ion-exchange capacity.

In the preparation of the fluorinated copolymers, one or more monomers for forming the units (a) and the units (b) are used. It is also possible to improve the mechanical strength of the membrane by combining one or more other monomer such as divinyl monomer e.g. CF$_2$=CFORf, CF$_2$=CF—CF=CF$_2$ and CF$_2$=CFO(CF$_2$)$_{1-4}$OCF=CF$_2$ wherein Rf represents a $C_1$–$C_{10}$ perfluoroalkyl group to crosslink the copolymer.

The fluorinated cation exchange membrane should be nonporous membrane because it should not substantially pass an electrolyte and selectively pass only specific ions as the characteristics of the ion-exchange membrane.

The thickness of the membrane is preferably 20 to 1000 microns especially 50 to 500 microns.

When the functional groups of the fluorinated cation exchange membrane are groups which can be converted to carboxylic acid groups, the functional groups can be converted to carboxylic acid groups by suitable treatment depending upon the functional groups.

When the functional groups are —CN, —COF, —COOR$_1$, —CONR$_2$R$_3$ (R$_1$ to R$_3$ are defined above), the functional groups can be converted to carboxylic acid groups by a hydrolysis or neutralization with an acid or an alcoholic aqueous solution of a base.

The another fluorinated cation exchange membranes having carboxylic acid groups as the functional groups used in the electrolysis of the present invention can be prepared by fabricating a fluorinated cation exchange membrane having the other functional groups and converting the functional groups to carboxylic acid groups. For example, the cation exchange membrane of a copolymer of a fluoroolefin such as tetrafluoroolefin and a fluorocarbon vinyl ether having functional groups of —SO$_2$L (L: hydroxyl group or a halogen atom) such as perfluoro [2-(2-fluorosulfonyl ethoxy)-propylvinyl ether] is treated with a reducing agent to convert the functional groups to carboxylic acid groups, as disclosed in Japanese Unexamined Patent Publication No. 122677/1976; No. 24176/1977 and No. 24177/1977.

The purification of an aqueous solution of sodium chloride (hereinafter referring to as NaCl aq. sol.) to reduce the calcium concentration to said range is preferably carried out by contacting the NaCl aq. sol. with the chelate ion-exchange substance, whereby the calcium component in the NaCl aq. sol. can be effectively removed to control the calcium concentration to said range and the other impurities such as magnesium ions (Mg$^{++}$) which form insoluble materials are also removed from the NaCl aq. sol.

Suitable chelate ion-exchange substance is resins capable of forming an intramolecular complex with calcium and magnesium which contains functional groups >N—CH$_2$COO$^-$. Preferable resin is styrene-divinyl benzene copolymer, styrene-butadiene copolymer, epichlorohydrin polymer, N-phenyl-glycine-glycidyl methacrylate copolymer. Another suitable chelate ion-exchange substance is adsorbent solid supporting chelate compounds capable of forming an intramolecular complex with calcium and magnesium which contain functional group >N—CH$_2$COO$^-$. Preferable chelate substances include ethylenediaminetetraacetic acid, trimethylenediaminetetraacetic acid, iminodiacetic acid, aminomethyl phosphonic diacetic acid or oligomers or alkali salts thereof.

Preferable adsorbent solids can be used which are active carbon, coal, silica gel, and zeolite.

An amount of the chelate substance and a time for contacting the chelate substance with the NaCl aq. sol. are selected so as to control the calcium concentration in the NaCl aq. sol.

The following process is an advantageous industrial process for purifying the NaCl aq. sol. by the chelate ion-exchange process.

The first and second chelate resin ion-exchange towers are connected in series by a passage in which a detector for detecting a small amount of impurities which should be removed. The ion-exchange life of one tower is longer than the regeneration time of the other tower mutually.

An aqueous solution of sodium chloride for electrolysis is treated by recycling process comprising steps (i) to (iii).

(i) a step of passing it from the first chelate resin ion-exchange tower through the detector to the second chelate resin ion-exchange tower;

(ii) a step of passing it through the second chelate resin ion-exchange tower and optionally;

(iii) a step of passing it from the second chelate resin ion-exchange tower through the detector to the first chelate resin ion-exchange tower.

In accordance with the purification system of this invention, the serious trouble caused in the regeneration of the chelate substance which is always found in the ion-exchange purification process, can be remarkably reduced and the purification can be continuously carried out and the chelate substance can be utilized at maximum efficiency depending upon the ion-exchange capacity of the chelate substance.

Even though the amounts of the impurities such as calcium and magnesium components in the aqueous solution of sodium chloride are suddenly increased, the amounts of the impurities in the purified aqueous solution of sodium chloride can be advantageously minimized by the process.

Figure 3:
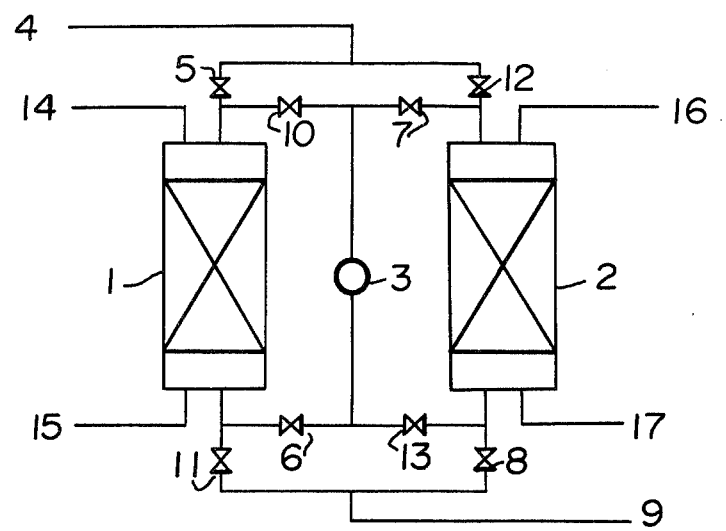
FIG. 3 is a schematic view of one embodiment of a purification process according to the present invention.

FIG. 3 shows one embodiment of the purification.

In FIG. 3, the reference numeral (1) designates the first chelate ion-exchange tower; (2) designates the second chelate ion-exchange tower. (1) and (2) are connected by a passage in which the detector (3) for detecting impurities of calcium and magnesium components in the NaCl aq. sol. is disposed.

It is unnecessary to fill the same type chelate substance in the ion-exchange towers (1), (2), and it is unnecessary to fill the same amount of the chelate compound. The kind and amount of the chelate substance can be varied as desired. The operation is selected depending upon the kind and amount of the chelate substance as described below.

The detector for detecting the impurities in the aqueous solution of sodium chloride which is disposed between the ion-exchange towers (1), (2) can be any type detector which can detect small amounts (1–2 ppm) of the impurities such as the EDTA titration method, the atomic absorption spectroscopy, or the EDTA automatic titration method.

The purification is carried out to purify the aqueous solution of sodium chloride by the recycling steps (i) to (iv).

In order to prolong the ion-exchange life of the chelate substance and to reduce the times for regeneration, it is preferable to decrease the amounts of the impurities in the aqueous solution of sodium chloride to lower than 30 ppm especially lower than 5 ppm by a sedimentation process etc., before feeding the aqueous solution to the purification system.

(i) The NaCl aq. sol. is fed from a pipe (4) through a valve (5) to the first ion-exchange tower (1), to ion-exchange it and then, it is fed through a valve (6), the detector (3) and a valve (7) to the second ion-exchange tower (2) and then, it is discharged through a valve (8) and a pipe (9) as a purified aqueous solution of sodium chloride. During the operation, valves (10), (11), (12) and (13) are closed to shut the flow through these valves.

The treatment in the step (i) is continued until the amount of the impurities detected by the detector (3) reaches the allowable amount of the impurities even though it is passed through the second ion-exchange tower (2) after substantially losing the ion-exchange capacity of the chelate substance in the first ion-exchange tower (1), preferably until the impurities are detected by the detector (3).

(ii) When it reaches the predetermined detection value, the valves (5), (6) and (7) are closed and the valve (12) is opened.

The NaCl aq. sol. is fed through the valve (12) to the second ion-exchange tower (2) wherein the ion-exchange is performed and it is discharged through the valve (8) as the purified aqueous solution of sodium chloride. During the step, the chelate substance in the first ion-exchange tower (1) is regenerated. The recovery can be carried out by the known process. The chelate substance is treated with a mineral acid such as hydrochloric acid to desorb the impurity ions in the free form and to regenerate it to the sodium salt with an aqueous solution of sodium hydroxide.

In FIG. 3, the regenerating agent is fed from the pipe (14) and is discharged through the pipe (15).

(iii) After the regeneration of the chelate compound in the first ion-exchange tower (1), the step (iii) is optionally carried out.

In the step, the valve (8) is closed, and the valves (13), (10) and (11) are opened. The aqueous solution of sodium chloride which is ion-exchanged in the second ion-exchange tower (2) is fed through the valve (13), the detector (3) and the valve (10) to the first ion-exchange tower (1).

The aqueous solution discharged from the first ion-exchange tower (1), is passed through the valve (11) and is discharged as the purified aqueous solution of sodium chloride (9).

The optional treatment in the step (iii) is continued until the amount of the impurities detected by the detector (3) reaches to the allowable amounts of the impurities even though it is passed through the first ion-exchange tower (1) after substantially losing the ion-exchange capacity of the chelate substance in the second ion-exchange tower (2), preferably until the impurities are detected by the detector (3).

(iv) After the step (ii) or the step (iii), the valves (8), (13), (12), (10), (6) are closed and the valves (5), (11) are opened. The NaCl aq. sol. is fed through the valve (5) to the first ion-exchange tower (1) to ion-exchange it and then, it is discharged through the valve (11) and the pipe (9), as the purified aqueous solution of sodium chloride. During the operation, the regenerating agent is fed through the pipe (16) to the ion-exchange tower (2) and is discharged through the pipe (17) to recover it. After regenerating the chelate substance in the second ion-exchange tower (2), the operation is returned to the step (i).

In accordance with the purification of the present invention comprising the steps (i) and (iv), the troubles caused by the recovery of the chelate substance in the chelate ion-exchange process can be overcome as described above and purification can be continuously carried out.

The switching from the step (i) to the step (ii) and the switching from the step (iii) to the step (iv) is carried out by utilizing the detector disposed between the two ion-exchange towers, whereby the trouble of discharging of the purified aqueous solution of sodium chloride containing more than allowable limit of the impurities, can be prevented and the operation of the ion-exchange towers can be continued until the ion-exchange capacity of the chelate substance is substantially full saturated.

When the switching is started by detecting the impurities by the detector disposed between the ion-exchange towers, the trouble can be prevented without failure and even though the amounts of the impurities in the NaCl aq. sol. is suddenly increased, the amounts of the impurities in the purified aqueous solution of sodium chloride can be always maintained to low level.

When the capacities of the first and second ion-exchange towers are the same, the towers are alternatively used, and the towers can be used in accordance with the description under the alternative consideration. On the other hand, it is possible to use the first and second ion-exchange towers which contain the chelate substance having different capacity or the different type chelate compound.

The tower for the first or second ion-exchange tower is not limited to be one.

Figure 4:
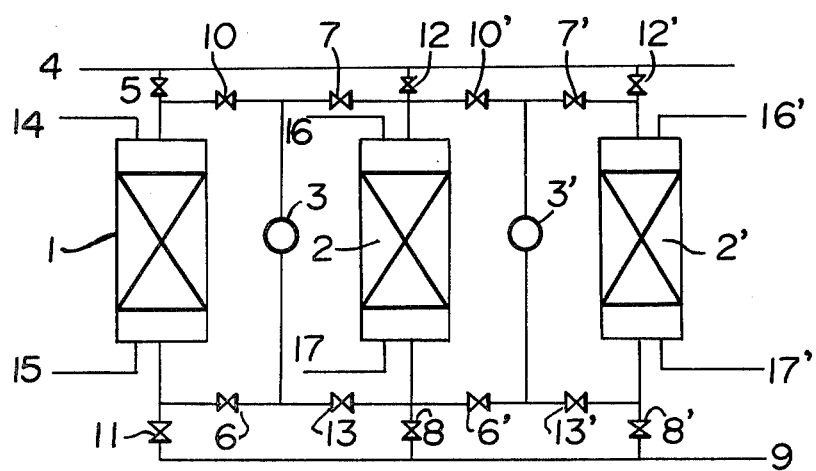
FIG. 4 is a schematic view of another embodiment of a purification process according to the present invention.

It is possible more than one ion-exchange towers can be used as the first and/or second ion-exchange tower as shown in FIG. 4. (two towers are used either the first or second tower in FIG. 4).

In this case, it is necessary to form the towers so as to have shorter ion-exchange life in comparison with that in FIG. 3.

The operation of the purification system shown in FIG. 4, can be carried out as follows.

In FIG. 4, the same reference numerals designate the identical or corresponding parts.

In FIG. 4, two towers are used as the second ion-exchange tower conveniently for description.

(i) The NaCl aq. sol. is fed from the pipe (4) through the valve (5), the first ion-exchange tower (1), the valve (6) the detector (3), valve (7) the second ion-exchange tower (2) and the valve (8) and it is discharged through the pipe (9) as the purified aqueous solution of sodium chloride. If necessarily, the solution discharged through the second ion-exchange tower (2) can be discharged through the valve (6'), the detector (3'), the valve (7') and the additional ion-exchange tower (2') and the valve (8') and the pipe (9), as the purified aqueous solution of sodium chloride.

(ii) When the first ion-exchange tower can not be used depending upon the amounts of the impurities detected by the detectors (3), the solution is passed through the valve (12), the second ion-exchange tower (2), the valve (6'), the detector (3'), the valve (7'), the additional ion-exchange tower (2') and the valve (8') and discharged as the purified aqueous solution of sodium chloride. During the operation, the chelate substance in the ion-exchange tower (1) is regenerated.

(iii) When the second ion-exchange tower (2) can not be used depending upon the detection by the detector (3'), the NaCl aq. sol. is fed through the valve (12'), the additional ion-exchange tower (2'), the valve (13'), the valve (6'), the valve (13), the detector (3), the valve (10), the first ion-exchange tower (1) and the valve (11) and discharged as the purified aqueous solution of sodium chloride. During the operation, the chelate substance in the second ion-exchange tower (2) is regenerated.

(iv) When the additional ion-exchange tower (2') can not be used depending upon the detection by the detector (3), the flow of the NaCl aq. sol. is the same with that of the step (i). During the operation, the chelate compound in the additional ion-exchange tower is regenerated.

Thus, 15 to 27 wt.% the aqueous solution of sodium chloride having a calcium concentration of 1 to 6 mg/liter can be purified to the calcium concentration of lower than 0.08 mg/liter.

When the chelate compound is used, the magnesium concentration in the aqueous solution of sodium chloride can be reduced to lower than 0.04 mg/liter which does not adversely affect to the electrolysis.

The magnesium concentration in the purified aqueous solution of sodium chloride is in said range, the satisfactory result as the industrial process can be attained.

In order to expect excellent effect and to completely prevent the adverse effect caused by the absorption of calcium component, the calcium concentration is preferably lower than 0.05 mg/liter especially lower than the critical calcium concentration depending upon the concentration of the purified aqueous solution of sodium hyroxide in the cathode compartment.

On the other hand, from the industrial viewpoint it is not preferable to reduce the calcium concentration in the purified aqueous solution of sodium chloride to lower concentration especially excessively lower than the critical calcium concentration, because the load for purification with the chelate compound is remarkably increased.

Under the consideration of the costs of equipment and operation in the purification system, the calcium concentration in the purified aqueous solution of sodium chloride is preferably more than 1/20 especially more than 1/5 of the critical calcium concentration.

The known ion-exchange membrane process can be employed as the process for the electrolysis of the aqueous solution of sodium chloride. For example, the electrolytic voltage is preferably in a range of 2.3 to 5.5 volts and the current density is preferably in a range of 5 to 100 A/dm$^2$.

The anode used in the electrolysis can be graphite or anticorrosive electrode having stability in size which is made of a titanium substrate coated with a platinum group metal or an oxide of platinum group metal. The system of the electrolytic cell can be the monopolar system or the bipolar system.

Thus, in the case of the two compartment cell wherein the anode compartment and the cathode compartment are formed by partitioning the anode and the cathode with the cation exchange membrane and an aqueous solution of sodium chloride is fed in the anode compartment to electrolyze it and to obtain an aqueous solution of sodium hydroxide from the cathode compartment it is possible to obtain the aqueous solution of sodium hydroxide having a concentration of 20 to 45% especially 25 to 40% at low electrolytic voltage and high current efficiency without a substantial deterioration of the membrane in stable for a long time by the electrolysis at 40° to 120° C. preferably 70° to 95° C. in the current density of 10 to 60 A/dm$^2$ with the raw material of the aqueous solution of sodium chloride having a concentration of higher than 3 normal.

The present invention will be further illustrated by certain specific examples, which are included for purposes of illustration only and are not intended to be limiting unless otherwise specified.

In the examples, an ion-exchange capacity of a cation exchange membrane is defined as follows.

A cation exchange membrane was immersed into 1 N-HCl at 60° C. for 5 hours to completely convert it to H-type membrane, and then, the membrane was washed with water so as to be free of HCl.

Then, 0.5 g of the H-type membrane was immersed into 25 ml of 0.1 N-NaOH to completely convert it to the Na$^+$ type membrane. Then, the membrane was taken out and the amount of NaOH in the solution was measured by a back titration with 0.1 N-HCl.

In the examples, the quantitative analysis of small amounts of calcium component and magnesium component in an aqueous solution of sodium chloride (brine) and an aqueous solution of sodium hydroxide are carried out as follows.

In the case of the aqueous solution of sodium chloride, hydrochloric acid was added and the mixture was heated to distil off the acidic components. In the case of the aqueous solution of sodium hydroxide, sodium hydroxide was neutralized to form sodium chloride.

Then, calcium component and magnesium component in the aqueous solution of sodium chloride was absorbed by using H$^+$ type chelate resin. The chelate resin was separated and the calcium component and the magnesium component absorbed in the chelate resin were desorbed with a small amount of hydrochloric acid. The calcium concentration and the magnesium concentration were quantitatively analyzed by the atomic absorption spectroscopy.

EXAMPLE 1

A 5 N-NaCl aqueous solution containing 3 mg/liter of calcium component and 0.5 mg/liter of magnesium component which was purified by the conventional sedimentation-separation process was fed into a tower filled with a chelate resin of styrene-divinylbenzene copolymer having iminodiacetatic acid groups as the functional groups (diameter 297 to 1190$\mu$) (Diaion CR-10 manufactured by Mitsubishi Chemical Ind. Ltd.) at a rate of 2000 liter NaCl aq. sol./liter wet chelate resin at a space velocity of 25 hr$^{-1}$ at 60° C. whereby the purified NaCl aqueous solution containing 0.008 mg/liter ($\pm$0.002 mg/liter) calcium component and 0.003 mg/liter ($\pm$0.002 mg/liter) of the magnesium component was obtained.

On the other hand, a fluorinated cation exchange membrane made of a hydrolyzed copolymer of tetrafluoroethylene and methyl perfluoro-5-oxa-6-heptenoate which had an ion-exchange capacity of 1.50 meq./g dry polymer and thickness of 300$\mu$, and ruthenium oxide coated titanium expand metal as the anode and a stainless steel expand metal as the cathode were assembled to form an electrolytic cell having an electrode space of 5 mm and an effective area of the membrane of 25 cm$^2$.

An electrolysis was carried out at 90° C. and the current density of 20 A/dm$^2$ under maintaining the concentration of sodium hydroxide in the cathode compartment of 40 wt.% by feeding the purified NaCl aqueous solution (5 N) into the anode compartment and feeding water into the cathode compartment under controlling the feed rates of them.

On the other hand, the calcium concentration in the NaCl aqueous solution was varied by adding calcium chloride to the purified NaCl aqueous solution and the variation of the Ca$^{++}$ precipitation velocity for precipitating the calcium component in the membrane (μg/hour·cm²) was measured. The results are shown in FIG. 1.

The Ca++ precipitation velocity for precipitation the calcium component in the membrane was measured from the flow rate of the charged NaCl aqueous solution [liter/hour] the flow rate of the discharged NaCl aqueous solution [liter/hour] and the flow rate of the resulting NaOH [liter/hour] and the calcium concentrations in said solutions.

It was confirmed that the resulting precipitation velocity was the same with the precipitation velocity obtained by measuring the calcium component accumulated in the membrane after the electrolysis.

As it is clearly understood from the linearity of the Ca++ absorption velocity in FIG. 1, the calcium concentration in the NaCl aqueous solution which causes the precipitation of the calcium component in the cation exchange membrane was 0.02 mg/liter.

Thus, when the calcium concentration in the NaCl aqueous solution was 0.008 mg/liter, the most of Ca++ ions were passed through the membrane and the accumulation of the calcium component was not caused.

On the other hand, when the calcium concentration in the NaCl aqueous solution was 0.10 mg/liter, the accumulation of Ca++ in the membrane was caused.

The distribution of the calcium component in the sectional part of the membrane used for the electrolysis of the NaCl aqueous solution having a calcium concentration of 0.10 mg/liter for 30 days was observed by a scanning type X-ray microanalyzer.

As the result of the observation, it was found that the calcium hydroxide depositing layer having a thickness 10 to 30μ was formed at the cathode side of the membrane.

Moreover, the sectional part of the membrane used for the electrolysis of the NaCl aqueous solution having a calcium concentration of 5 mg/liter for 40 days was observed. As the result of the observation, it was found that the structure of the membrane was expanded by the particles of calcium hydroxide and the mechanical strength of the membrane was remarkably decreased.

Figure 2:
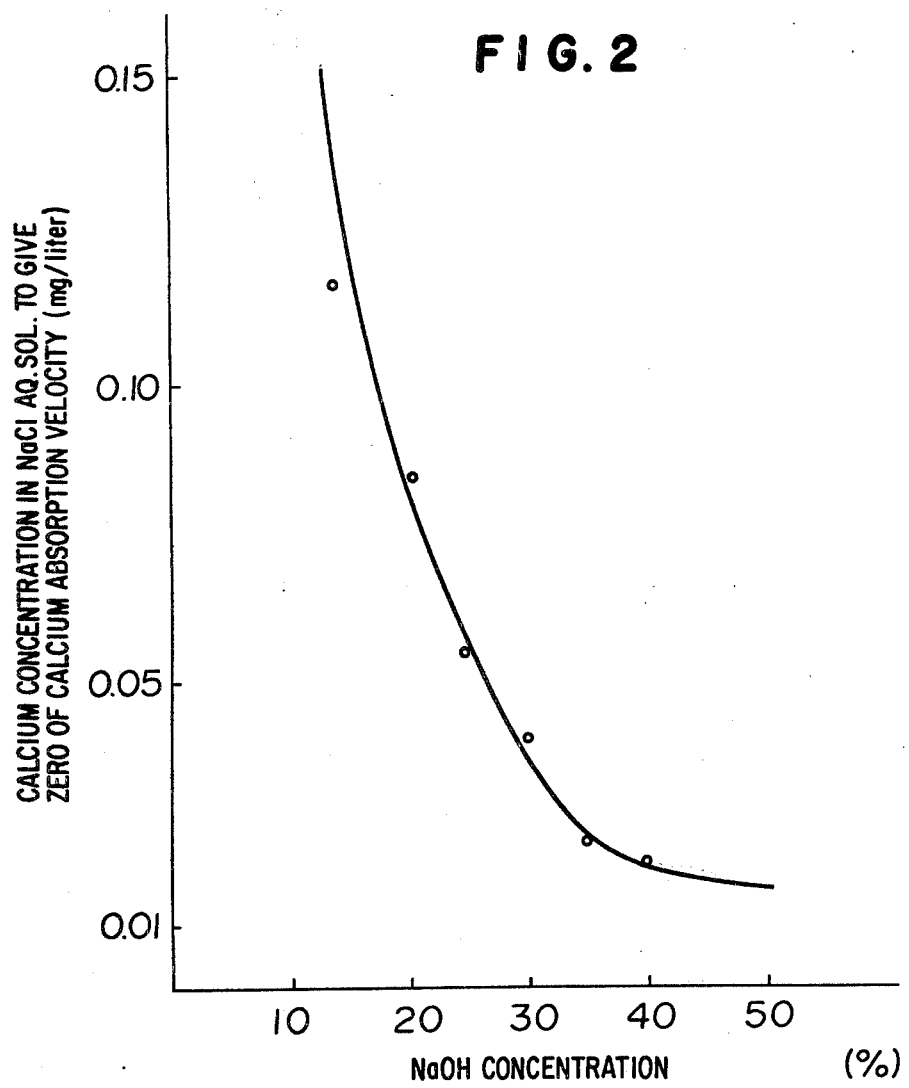
FIG. 2 shows the relation between the concentration of the resulting sodium hydroxide (%) and the calcium concentration in an aqueous solution of sodium chloride (mg/liter) to give zero of the calcium precipitation velocity.

The concentration of sodium hydroxide was varied in a range of 20 to 45 wt.%, and the critical calcium concentration in the NaCl aqueous solution to give zero of the Ca++ precipitation velocity for precipitation the calcium component to the membrane was measured. The results are shown in FIG. 2.

EXAMPLES 2 TO 5 AND REFERENCES 1 TO 4

In accordance with the process of Example 1, except for variations in the calcium concentration in the NaCl aqueous solution, each electrolysis was carried out for an extended period of time. The results are shown in Table 1.

Table 1

| Example and Reference | Example | | | | Reference | | | |
|---|---|---|---|---|---|---|---|---|
| | 2 | 3 | 4 | 5 | 1 | 2 | 3 | 4 |
| Calcium concentration (mg/liter) | 0.008 | 0.010 | 0.010 | 0.014 | 0.1 | 0.4 | 0.1 | 0.2 |
| NaOH concentration (%) | 40 | 35 | 35 | 35 | 40 | 35 | 35 | 35 |
| Concentration of NaCl aqueous solution (N) | 4 | 3 | 4 | 4 | 4 | 4 | 4 | 4 |

Table 1-continued

| Example and Reference | Example | | | | Reference | | | |
|---|---|---|---|---|---|---|---|---|
| | 2 | 3 | 4 | 5 | 1 | 2 | 3 | 4 |
| Current density (A/dm²) | 20 | 20 | 40 | 20 | 20 | 40 | 40 | 20 |
| Current efficiency (%) | | | | | | | | |
| 10 days | 96 | 96 | 96 | 96 | 96 | 95 | 96 | 96 |
| 30 days | 96 | 97 | 97 | 97 | 95 | 89 | 94 | 94 |
| 60 days | 95 | 97 | 97 | 97 | 93 | | 92 | 93 |
| 182 days | 94 | 97 | 97 | 97 | 90 | | 90 | 90 |
| 360 days | 93 | 96 | 96 | 96 | | | | |
| 550 days | | 96 | 96 | 96 | | | | |

In the examples, the magnesium concentration in the NaCl aqueous solution was lower than 0.003±0.002 mg/liter.

In Examples 3 to 5 no substantial rise of the cell voltage was found after 360 day or 550 days. On the contrary, in References 1 to 5 the rise of the cell voltage for 0.1 to 0.5 volt was found after 180 days.

EXAMPLES 6 AND 7 AND REFERENCES 5 AND 6

In accordance with the process of Example 1 except employing a fluorinated cation exchange membrane made of a hydrolyzed copolymer of tetrafluoroethylene $CF_2=CFOCF(CF_3)CF_2O(CF_2)_3COOCH_3$ and $CF_2=CFO(CF_2)_3COOCH_3$ having an ion-exchange capacity of 1.2 meq/g dry polymer and varying the condition passing through the chelate resin layer to vary the calcium concentration in the NaCl aqueous solution, each electrolysis was carried out for an extended period of time. The results are shown in Table 2.

Table 2

| Example and Reference | Example | | Reference | |
|---|---|---|---|---|
| | 6 | 7 | 5 | 6 |
| Calcium concentration (mg/liter) | 0.009 | 0.005 | 0.15 | 0.12 |
| NaOH concentration (%) | 25 | 30 | 25 | 30 |
| Concentration of NaCl aqueous solution (N) | 4 | 3 | 4 | 3 |
| Current density (A/cm²) | 40 | 40 | 40 | 40 |
| Current efficiency (%) | | | | |
| 10 days | 95 | 96 | 95 | 97 |
| 30 days | 94 | 97 | 94 | 96 |
| 60 days | 95 | 97 | 93 | 96 |
| 182 days | 94 | 97 | 92 | 92 |
| 360 days | 95 | 96 | 91 | 90 |
| 550 days | 95 | 97 | 91 | 90 |

EXAMPLE 8

A membrane of a copolymer of tetrafluoroethylene and perfluoro-3,6-dioxa-4-methyl-7-octenesulfonylfluoride was hydrolyzed. The membrane had an ion-exchange capacity of 0.8 meq/g dry polymer. The sulfonic acid type membrane was converted to the sulfonylchloride type membrane with phosphorus pentachloride and phosphorus oxychloride and one surface of the membrane was treated with an aqueous solution of hydrogen iodide and further hydrolyzed to convert the thin layer on one side to carboxylic acid type.

The carboxylic acid modified surface of the membrane was disposed to the cathode compartment and the electrolysis for durability test was carried out as in the process of Example 4 by feeding the NaCl aqueous solution having a calcium concentration of 0.01 mg/liter under maintaining the concentration of NaOH to 35 wt.%. As the result, the current efficiency was substantially constant at 93% for 180 days.

On the other hand, the same electrolysis for durability test was carried out except feeding the NaCl aqueous solution having a calcium concentration of 0.1 mg/liter.

As the result, the current efficiency after 180 days was 87%.

REFERENCES 7 AND 8

In accordance with the processes of Example 4 and Example 7 except adding magnesium chloride to the purified NaCl aqueous solution, each electrolysis for durability test was carried out. The results are as follows.

Table 3

| Reference | Ref. 7 | Ref. 8 |
|---|---|---|
| Concentration of impurities in NaCl aq. sol. | | |
| $Mg^{++}$ mg/liter | 0.10 | 0.10 |
| $Ca^{++}$ mg/liter | 0.010 | 0.005 |
| NaOH concentration (%) | 35 | 30 |
| Concentration of NaCl aq. sol. (N) | 4 | 3 |
| Current density ($A/dm^2$) | 40 | 40 |
| Current efficiency | | |
| 10 days | 96 | 96 |
| 30 days | 96 | 96 |
| 60 days | 93 | 94 |
| 180 days | 90 | 91 |

Concentration of charged NaCl aq. sol.: 5 N

The concentrations of the anolyte and the catholyte were controlled to the specific concentrations by controlling the flow rate of water to the cathode compartment and the flow rate of the NaCl aq. sol. to the anode compartment in the continuous electrolysis.

EXAMPLE 9

The purification of the aqueous solution of sodium chloride in the process of Example 1 was carried out in the system comprising two ion-exchange towers shown in FIG. 3.

The first and second ion-exchange tower (1), (2) were connected in series by a passage in which the detector (3) (Water analyzer II type manufactured by Nippon Technicon K.K.) and the automatic switching type valves (5), (6), (7), (8), (10), (11), (12), (13) were connected in the passages to form the purification system.

As the chelate resin, 150 liter of granular ion-exchanger of styrene-divinylbenzene copolymer having iminodiacetic acid groups (diameter of 297 to 1190μ) (Diaion CR-10 manufactured by Mitsubishi Chemical Ind. Ltd.) was filled in the towers.

The saturated aqueous solution of sodium chloride having a calcium concentration of 7.8 ppm and a magnesium concentration of 1.5 ppm which was purified by the sedimentation-separation process (concentration of NaCl; about 300 g/liter at about 60° C.) was fed to the system at a feed rate of about 4.1 m³/hour and it was continuously treated as follows.

(i) The NaCl aq. sol. was fed from the pipe (4) through the valve (5), the ion-exchange tower (1), the valve (6), the detector (3), the valve (7), the ion-exchange tower (2) and the valve (8) and the purified NaCl aq. sol. was discharged through the pipe (9).

It took about 60 hours until deflection of $Ca^{++}$ and $Mg^{++}$ in the NaCl aq. sol. by the detector (3). The time was about 75% of the theoretical ion-exchange capacity life of the chelate resin in the ion-exchange tower (1). (The concentrations of $Ca^{++}$, $Mg^{++}$ and $Fe^{++}$ in the purified NaCl aq. sol. could not detected.)

(ii) At the time of detection of the impurity ions by the detector (3), the valves were switched to feed the NaCl aq. sol. through the valve (12), the ion-exchange tower (2) and the valve (8) and the purified NaCl aq. sol. was discharged.

On the other hand, the NaCl aq. sol. in the ion-exchange tower (1) was purged with water and the chelate resin in the ion-exchange tower (1) was regenerated by feeding 1 N-HCl and then 1 N-NaOH during about 5 hours.

(iii) After regenerating the ion-exchange tower (1), the valves were switched and the NaCl aq. sol. discharged from the ion-exchange tower (2) was discharged through the valve (13), the detector (3), the valve (10), the ion-exchange tower (1) and the valve (11) as the purified solution.

It took about 60 hours from the switching of the step (i) to the step (ii) to the detection of the impurity ions by the detector (3). This time was about 75% of the theoretical ion-exchange capacity life of the chelate resin in the ion-exchange tower (2).

(iv) At the time detection of the impurity ions by the detector (3), the valves were switched to feed the NaCl aq. sol. through the valve (5), the ion-exchange tower (1) and the valve (11) to discharge the purified NaCl aq. sol. During the operation, the chelate resin in the ion-exchange tower (2) was regenerated in the same manner as that of the ion-exchange tower (1) for 5 hours. After the regeneration of the chelate resin in the ion-exchange tower (2), the operation was returned to the step (i).

What is claimed is:

1. In a process for producing sodium hydroxide by an electrolysis of an aqueous solution of sodium chloride by employing a fluorinated cation exchange membrane having an ion-exchange capacity of 0.8 to 2.0 meq/g dry polymer and having carboxylic acid groups as functional groups and maintaining a concentration of an aqueous solution of sodium hydroxide in a cathode compartment in a range of 20 to 45 wt.%, an improvement characterized by electrolyzing the aqueous solution of sodium chloride while maintaining a calcium concentration in the aqueous solution of sodium chloride lower than 0.08 mg/liter and a magnesium concentration lower than 0.04 mg/liter.

2. A process according to claim 1 wherein the calcium concentration in the aqueous solution of sodium chloride is maintained to lower than 0.08 mg/liter by passing the aqueous solution through a chelate ion-exchange tower.

3. A process according to claim 2 wherein the chelate substance consists of resins capable of forming an intramolecular complex with calcium and magnesium which contains the functional group having the formula
$>N-CH_2COO^-$.

4. A process according to 2 wherein the chelate substance consists of adsorbent solid supporting chelate compounds capable of forming an intramolecular complex with calcium and magnesium which contains the functional group having the formula
>N—CH₂COO⁻.

5. A process according to claim 1 or 4 wherein an aqueous feed solution of sodium chloride having impurities in an amount less than 30 ppm and calcium greater than 0.08 mg/liter is purified to give a calcium concentration of lower than 0.08 mg/liter and magnesium concentration of less than 0.04 mg/liter in a system comprising a first ion-exchange tower and a second ion-exchange tower which are filled with chelate substance for removing calcium and magnesium and are connected in series through a detector for detecting small amounts of calcium and magnesium impurities by employing steps of a cycle comprising a step (1) of passing the aqueous feed solution of sodium chloride to the first ion-exchange tower and then through the detector to the second ion-exchange tower; and continuing said step until the amount of impurities detected in the detector reaches a predetermined value; and thereafter in a step (2) of passing the feed solution through the second ion-exchange tower while regenerating the first tower; and thereafter carrying out a step (3) of passing the feed solution through the first ion-exchange tower, while regenerating the second tower and then repeating the cycle.

6. A process according to claim 5 wherein the chelate substance is capable of forming an intramolecular complex with calcium and magnesium, contains the functional group >NCH₂COO⁻ and is a resin or an adsorbent solid supporting chelate compounds and wherein the calcium concentration is maintained at a calcium concentration substantially that or less than that corresponding to the graph of FIG. 2 for a given sodium hydroxide concentration in the cathode compartment.

7. A process according to claim 5, wherein said steps of said cycle further comprise a step (2′) intermediate steps (2) and (3), which comprises, after regeneration of the first tower, passing the feed solution to the second ion-exchange tower and then through the detector to the first ion-exchange tower; and continuing said step until the amount of impurities detected in the detector reaches a predetermined value.

8. A process according to claim 5, wherein the chelate substance consists of resins capable of forming an intramolecular complex with calcium and magnesium which contains the functional group having the formula:
>N—CH₂COO⁻.

9. A process according to claim 5, wherein the chelate substance consists of adsorbent solid supporting chelate compounds capable of forming an intramolecular complex with calcium and magnesium which contains the functional group having the formula
>N—CH₂COO⁻.

10. A process according to claim 1 wherein the fluorinated cation exchange membrane is made of a copolymer having units (a) of ⫲CF₂—CXX′⫳ and units (b) of $$+CF_2-CX+ \atop Y \qquad (b)$$

wherein X represents fluorine, chlorine or hydrogen atom or —CF₃; X′ represents X or CF₃(CF₂)ₘ—; m represents an integer of 1 to 5 and Y represents $$+CF_2+_p A, \quad -O+CF_2+_p A, \quad +O-CF_2-CF+_q A, \atop Z$$

$$+O-CF_2-CF+_p+O-CF_2-CF+_q A, \atop Z \qquad Rf$$

$$-O-CF_2+CF-O-CF_2+_p+CF_2+_q+CF_2-O-CF+_r A, \text{ and} \atop Z \qquad Rf$$

$$+CF_2+_p+CH_2+_q A \text{ and}$$

p, q and r respectively represent an integer of 1 to 10; Z and Rf represent —F or a C₁-C₁₀ perfluoroalkyl group;
A represents $$-COOH \text{ or } -CH, -COF, -COOR_1, -COOM, -CON{\overset{R_2}{\underset{R_3}{\diagdown}}}$$

as a functional group which can be converted to carboxylic acid group by a hydrolysis or a neutralization; R₁ represents a C₁-C₁₀ alkyl group; M represents an alkali metal or quaternary ammonium group; R₂ and R₃ respectively represent a C₁-C₁₀ alkyl group.

11. A process according to claim 10 wherein the copolymer is prepared by copolymerizing a monomer having the formula CF₂=CXX′ and a monomer having the formula CF₂=CXY (wherein X, X′ and Y are defined in claim 2).

12. A process according to claim 1, 10 or 11 wherein a calcium concentration in the aqueous solution of sodium chloride is maintained in a range of 0.005 to 0.08 mg/liter.

* * * * *